(No Model.)

A. PIERRA.
CAR FENDER.

No. 533,916. Patented Feb. 12, 1895.

Witnesses
J. W. Reynolds
L. G. Randall

Inventor
Adolfo Pierra
By John Wedderburn
his Attorney

UNITED STATES PATENT OFFICE.

ADOLFO PIERRA, OF PHILADELPHIA, PENNSYLVANIA.

CAR-FENDER.

SPECIFICATION forming part of Letters Patent No. 533,916, dated February 12, 1895.

Application filed November 2, 1894. Serial No. 527,745. (No model.)

*To all whom it may concern:*

Be it known that I, ADOLFO PIERRA, a citizen of the United States, residing at Philadelphia, in the county of Philadelphia and State of Pennsylvania, have invented certain new and useful Improvements in Car-Fenders; and I do hereby declare the following to be a full, clear, and exact description of the invention, such as will enable others skilled in the art to which it appertains to make and use the same.

My invention relates to fenders for tramway cars adapted to be run by electricity, cable, or other motive power except animal power, the object of the same being to provide a fender adapted to be coupled and uncoupled from either end of the said car.

The invention consists of a fender made of a frame work of iron or other suitable material, having rollers at the bottom thereof, two on the side adapted to run along the track, and the one at the center adapted to traverse the ground between the tracks. This frame work is covered with bed spring or other resilient substance, lined with canvas or leather, and padded with straw so as to inflict as little injury as possible on any living being struck thereby. It further has a bar projecting rearwardly therefrom connected to the frame, which is adapted to fit the opening in the draw head of the car and be coupled therewith by means of a pin or any other suitable coupling device.

The invention is clearly illustrated in the accompanying drawings, in which—

Figure 1:
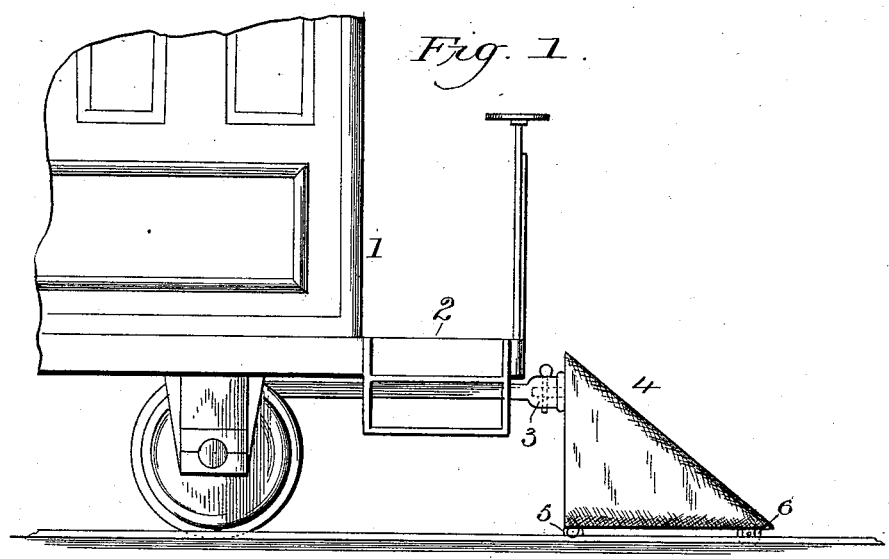
Figure 2:
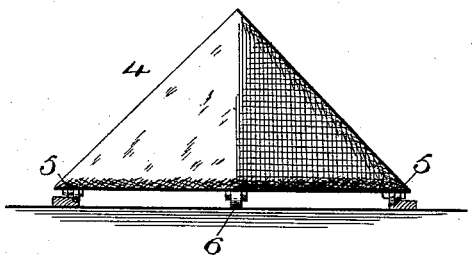
Figure 3:
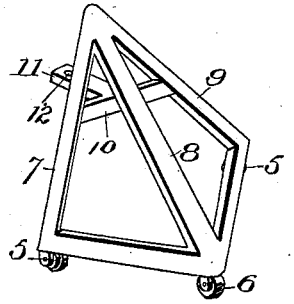

Figure 1 represents a side elevation of my fender shown attached to a car. Fig. 2 is a front elevation of the same, and Fig. 3 is a detail perspective view of the fender with its resilient covering removed.

Similar numerals of reference indicate like parts in the several views.

1 represents a car having the usual platform 2 and draw head 3.

4 represents my fender, which is made of iron or other suitable material, being triangular at its base, and having horizontal beams which are provided with lugs on which are mounted rollers or wheels 5, 5, and 6. The wheels 5, 5, are flanged and are adapted to run along the track. They are preferably about two inches in diameter, so as to permit the fender to run very close to the ground. The roller 6 is of somewhat larger diameter and travels between the two tracks. Leading upward from the points at which the wheels 5, 5, and 6 are located are three convergent bars 7, 8 and 9, thereby forming the fender in the shape of an ordinary cow-catcher, that is, with an angular front surface. The bars 7 and 9 are connected by a suitable cross beam 10 which has also secured thereto or made integral therewith a rearwardly extending rod or bar 11 which is slotted as shown at 12 and is adapted to be inserted in the opening in the draw head 3 and be secured therein by means of suitable coupling pins. The frame of the fender thus described, is covered with wire netting or with bed spring lined with strong canvas or leather and padded with straw. This is for the purpose of inflicting as little injury as possible upon an object with which the fender is brought in contact.

The fender is made of heavy material and is intended to weigh at least two hundred pounds, so that when an object is struck it will not rise and allow the same to pass beneath the car, but will turn it aside.

It will be seen that the said fender can be readily attached to and detached from either end of a car, and that the device is very simple in construction and effective in operation.

Having now described my invention, what I claim as new, and desire to secure by Letters Patent, is—

In combination with a car, having a suitable draw head, of a fender therefor made of a heavy frame work consisting of a triangular base which has converging beams extending therefrom and a cross beam connecting two of said beams, the said frame work being covered with wire netting or other suitable resilient material, wheels at the three corners of said triangular base, two of which wheels are adapted to rest upon and move along the track, and the third wheel adapted to traverse the path between the tracks and a rearwardly extending bar secured to the cross bar of the frame of said fender and adapted to be inserted in and withdrawn from the draw head of the car, whereby the said fender may be coupled and uncoupled with said car, substantially as and for the purposes specified.

In testimony whereof I have signed this specification in the presence of two subscribing witnesses.

ADOLFO PIERRA.

Witnesses:
JOHN A. STEARNS,
J. F. SHIELDS.